United States Patent
Zhang et al.

(10) Patent No.: US 10,032,550 B1
(45) Date of Patent: Jul. 24, 2018

(54) MOVING-COIL HAPTIC ACTUATOR FOR ELECTRONIC DEVICES

(71) Applicant: Apple Inc., Cupertino, CA (US)

(72) Inventors: Zhipeng Zhang, Santa Clara, CA (US); Richard H. Koch, Cupertino, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 15/474,638

(22) Filed: Mar. 30, 2017

(51) Int. Cl.
| | | |
|---|---|---|
| *G06F 1/16* | (2006.01) | |
| *H05K 5/00* | (2006.01) | |
| *H05K 7/00* | (2006.01) | |
| *H01F 7/16* | (2006.01) | |
| *H01F 7/02* | (2006.01) | |

(52) U.S. Cl.
CPC ......... H01F 7/1646 (2013.01); H01F 7/0205 (2013.01); H05K 5/0017 (2013.01)

(58) Field of Classification Search
CPC ........ G06F 1/16; G06F 1/1633; H01F 7/1646; H01F 7/0205; H05K 5/0017
USPC ............... 361/679.55, 679.56, 679.21–679.3
See application file for complete search history.

(56) References Cited

U.S. PATENT DOCUMENTS

| | | | | |
|---|---|---|---|---|
| 7,582,500 B2 * | 9/2009 | Chou | ................... | G01N 27/414 438/49 |
| 8,138,869 B1 * | 3/2012 | Lauder | ................... | G06F 1/1613 24/303 |
| 8,143,983 B1 * | 3/2012 | Lauder | ................... | G06F 1/1626 24/303 |
| 8,223,489 B2 * | 7/2012 | Shih | .................. | E05C 19/16 361/679.55 |
| 8,638,549 B2 * | 1/2014 | Garelli | ................... | G06F 1/1615 361/679.26 |
| 8,797,721 B2 * | 8/2014 | Pakula | ................... | G06F 1/1626 361/679.01 |
| 2013/0255875 A1 * | 10/2013 | Lozano Villarreal | ...................... | B29C 66/1224 156/250 |
| 2013/0328741 A1 * | 12/2013 | Degner | ................. | G06F 1/1658 343/841 |
| 2013/0329396 A1 * | 12/2013 | Smith | ................... | G06F 1/1656 362/23.03 |
| 2013/0329450 A1 * | 12/2013 | Degner | ................. | G06F 1/1616 362/602 |

\* cited by examiner

*Primary Examiner* — Anthony Haughton
(74) *Attorney, Agent, or Firm* — Brownstein Hyatt Farber Schreck, LLP

(57) ABSTRACT

A haptic actuator features magnets coupled to an enclosure and a movable mass with a conduction loop coupled to the enclosure via one or more movement elastic members. One or more conduction elastic members may be used to transmit signals to the conduction loop to cause the movable mass to move bilinearly relative to the enclosure and the magnets. The magnets may consist of a Halbach array to direct magnetic flux toward the conduction loop and away from other device components. Ferrofluid may be included between one or more of the magnets and the conduction loop to act as a damper in the system to improve haptic feedback. Closed loop control, such as back EMF, capacitive sensing, and magnetic sensing, may be included to improve system response.

20 Claims, 17 Drawing Sheets

MOVING-COIL HAPTIC ACTUATOR FOR ELECTRONIC DEVICES

FIELD

Embodiments described herein relate to electronic devices, and in particular, to electronic devices that incorporate a haptic feedback system to provide haptic output to a user.

BACKGROUND

An electronic device can include a mechanical actuator to generate tactile sensations for a user, generally referred to as "haptic output." Mechanical output from the actuator can inform the user of a specific mode, operation, or state of the electronic device, or for any other suitable purpose. Such actuators, together with associated electronic circuitry, can be referred to as "haptic output components."

Some haptic output components are linear actuators that include an enclosure, a conductive coil coupled to the enclosure, and a movable mass that includes a magnet that is operable to move relative to the enclosure and the coil when a current is applied to the coil. This contributes to undesirable magnetic interference between the moving magnets and other components of the electronic device.

SUMMARY

Certain embodiments described herein relate to, include, or take the form of an electronic device including: a device casing, a display coupled to the device casing, an actuator, and a controller. The actuator is coupled to the device casing and provides haptic feedback at the electronic device. The actuator includes an enclosure that forms an interior volume. A magnet is attached to the enclosure and may be configured to generate a first magnetic field in the interior volume. A movable mass is disposed in the interior volume of the enclosure. The movable mass is configured to oscillate within the interior volume along a longitudinal axis of the enclosure. The actuator further includes a conduction loop affixed to the movable mass and operative to generate a second magnetic field responsive to an electrical current. The actuator further includes a movement elastic member between the movable mass and the enclosure. The movement elastic member is configured to exert a force which varies with a position of the movable mass. The actuator further includes a conduction elastic member coupled to the enclosure and the conduction loop and configured to convey an electromagnetic signal. The controller is coupled to the conduction loop by the conduction elastic member and is configured to send the electromagnetic signal to the conduction loop.

Other embodiments described generally reference an actuator for providing haptic feedback in an electronic device. The actuator includes an enclosure defining a first side and a second side opposite the first side, a first magnet coupled to the first side of the enclosure, a second magnet coupled to the second side of the enclosure opposite the first side, a movable mass disposed between the first and second magnets, and a conduction loop connected to the movable mass. The actuator further includes a first movement elastic member attached to the enclosure and a first connection location of the movable mass and a second movement elastic member attached to the enclosure and a second connection location of the movable mass. The actuator further includes a conduction elastic member coupled to the enclosure and the movable mass. The conduction elastic member is electrically coupled to the conduction loop.

Still further embodiments described herein generally reference a method for operating a controller for an actuator for providing haptic feedback to an electronic device including the operations of transmitting a drive signal to a conduction loop of an actuator that causes a movable body within the actuator to oscillate, receiving feedback data indicating a position of a movable body within the actuator, generating a signal for providing a haptic output based on the feedback data, transmitting the signal to the conduction loop, receiving second feedback data indicating a second position of the movable body, and verifying that the haptic output matches a desired haptic output using the second feedback data.

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
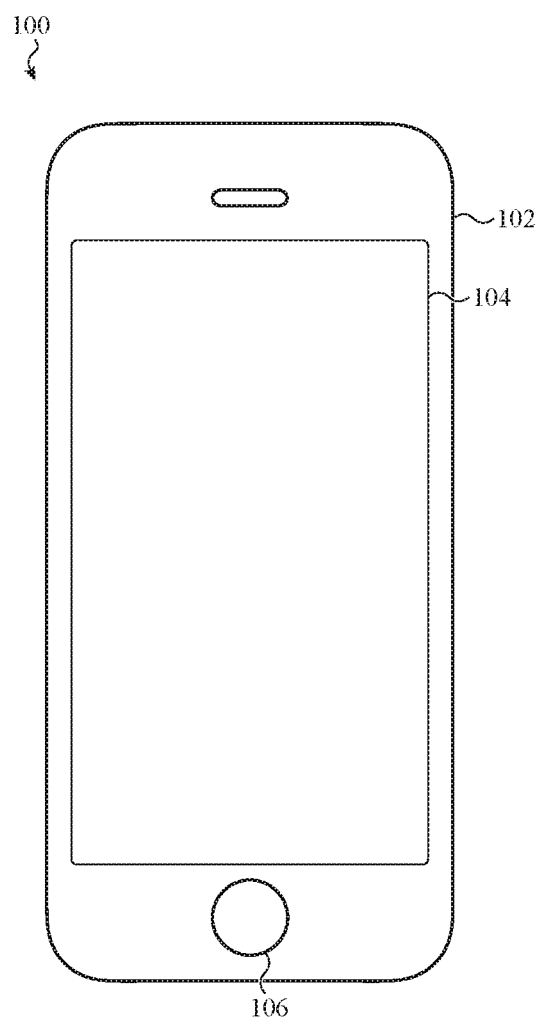
FIG. 1 illustrates an example electronic device that may incorporate a haptic feedback system according to one or more embodiments presented herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

The embodiments disclosed herein are directed to a haptic feedback system for use as part of an electronic device. An electronic device transmits a signal to a user in the form of a haptic output (e.g., a tactile output). Examples include a smart watch that vibrates at a scheduled time, a cell phone that vibrates for an incoming call, a tablet or other touch-sensitive computing device that provides feedback in response to a sensed touch, a track pad that provides haptic feedback to confirm an input, and many others. A haptic feedback system, as described herein, includes one or more haptic actuators for providing a haptic output, a controller for controlling operations of the haptic actuator, and/or one or more feedback sensors for enabling closed loop control of the haptic actuator.

A haptic actuator generates a haptic output. Haptic actuators often include a support mechanism (e.g., a housing or an enclosure) attached to an electronic device, for example within a device housing, device casing, or device enclosure, and a linear actuator that moves a mass in varying directions; changes in momentum of the mass are transmitted through the support mechanism to the electronic device. In particular, linear actuators work by moving a mass in one or both directions substantially along a single line or axis.

The linear actuators described herein operate to produce a haptic output by moving a mass bilinearly, that is, in both directions along a single line. Such bilinear motion may be termed "linear motion" and objects exhibiting such bilinear motion will be said to be moving "linearly." Through conservation of momentum, changes in the direction of motion of the mass are transferred to support mechanisms of the mass. When the support mechanisms are connected to an electronic device, either directly or through intermediate components such as a housing or enclosure for the actuator, the changed momentum of the mass is transferred to the electronic device and so produces a haptic output.

Some forms of linear actuators are configured to have one or more current carrying coils of wires that are stationary within a housing. In those forms, a movable mass may include one or more magnets, either permanent magnets or electromagnets. Electrical current (e.g., alternating current, electromagnetic signals, drive signals, and the like) induced in the current carrying coils generates magnetic fields that in turn exert electromagnetic forces on the magnets of the movable mass. As used herein, an "electromagnetic force" denotes an electric force, a magnetic force, or a combination thereof.

In contrast, some linear actuators described herein include stationary magnetic masses (e.g., permanent magnets, electromagnets, and the like) attached to a housing of the linear actuator. In some embodiments, the housing defines an interior volume. A dynamic body (e.g., movable mass, movable body) within the interior volume of the housing is attached to one or more conduction loops (e.g., electromagnetic coils, electrically conductive coils, wire loops, other electrically conductive materials, and the like). Electrical currents (e.g., alternating current, electromagnetic signals, drive signals, and the like) induced in the conduction loops result in a Lorentz force that can cause the conduction coils to move, thereby causing the attached movable mass to move. The motion of the movable body is constrained and controlled by various mechanisms within the actuator, including springs, elastic members, and the like, as discussed in more detail below. As a result, the movable body oscillates within the interior volume along a longitudinal axis of the housing.

Further, magnetic fields generated by the stationary magnets can be oriented to pass into a housing made of a ferritic material. Typically, but not necessarily, a ferritic material has a high magnetic permeability. When the stationary magnets are arranged in a linear array and adjacent magnets of the array have alternating polarities, the magnetic flux from the permanent magnets may be mostly confined to the housing and to shield components outside the haptic actuator from magnetic fields. An example arrangement of stationary magnets is a Halbach array. Further, a ferritic housing can shield the internal components of the haptic actuator from electromagnetic fields originating outside the haptic actuator.

When the movable mass is made, at least in part, of a ferritic material, the magnetic fields produced by the magnets or magnetic masses can then be channeled into the interior volume and so reduce fringing effects of the magnetic fields. This can increase the strength of the magnetic fields that contribute to the Lorentz force, and so produce a stronger haptic output from less electrical current. In one embodiment, the movable mass has a relatively thin middle portion and thicker outside portions. This helps to minimize the thickness of the actuator as a whole by providing space above and below the middle portion for placement of the magnets. Further, the thicker outside portions increase the weight of the movable mass which allows for a stronger haptic output by the actuator.

The movable mass may be attached to the actuator housing or enclosure by one or more elastic members to facilitate movement (e.g., oscillation) of the mass within the enclosure (herein "movement elastic members"). Example movement elastic members include springs (herein "motion springs"), gels, elastomers, and the like. In one embodiment, the motion springs are flexure springs.

The movable mass, the conduction loop, or both may be electrically coupled to the enclosure to facilitate transmission of electrical current, such as electromagnetic signals and drive signals, to the conduction loop. In one embodiment, the movable mass is electrically coupled to the enclosure by one or more elastic members to maintain the electrical connection between the enclosure and the conduction loop even when the movable mass is moving within the enclosure (herein, "conduction elastic members"). The conduction elastic member may be a spring (herein, "contact springs"), a gel, an elastomer, or the like. This can create or facilitate a reliable connection between the enclosure and the movable mass over thousands, millions, or more cycles of movement of the movable mass. In one embodiment, the reaction force (e.g., spring force) of the movement elastic member is much greater than the reaction force of the conduction elastic member, such that the conduction elastic member does not materially influence the dynamics of the movable mass.

The movable mass and the magnetic masses (e.g., magnets) may be separated by a medium that allows relative motion of each. In one embodiment, this medium is air. In another embodiment, this medium is a fluid, which can act as a damper to help control the oscillation of the movable mass. Additionally, some combination of air and fluid may be used, for example fluid on one side of the movable mass and air on another side. The fluid may be a ferrofluid, a magnetized fluid, or similar. In embodiments where a ferrofluid is disposed between the movable mass and one or more of the magnets, the ferrofluid may direct magnetic flux toward the movable mass to increase the efficiency of the haptic actuator by requiring a smaller input signal amplitude to achieve the same electrical current in the conduction loop. The ferrofluid also has the advantage of being held in place by magnetic forces from the magnet, and thus does not require additional structure or mechanisms for containment, which allows for less overall complexity, weight, and volume of the haptic actuator.

In one embodiment, the haptic feedback system includes a controller electrically coupled to the haptic actuator to control operation of the haptic actuator. The controller can include, or can be communicably coupled to, circuitry and/or logic components, such as a processor. The circuitry can perform or coordinate some or all of the operations of the controller including, but not limited to: providing a signal to a haptic actuator to generate an output; receiving a feedback signal from a haptic actuator; generating signals based on feedback; and so on.

The controller can be implemented as any electronic device or component capable of processing, receiving, or transmitting data or instructions in an analog and/or digital domain. For example, the controller can be a processor such as a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

Accordingly, as described herein, the phrase "controller" refers to a hardware-implemented data processing device or circuit physically structured to execute specific transformations of data including data operations represented as code and/or instructions included in a program that can be stored within and accessed from an integrated or separate memory. The term or phrase is meant to encompass a single processor or processing unit, multiple processors, multiple processing units, analog or digital circuits, or other suitably configured computing element or combination of elements.

In one embodiment, the haptic feedback system includes one or more feedback sensors electrically coupled to the haptic actuator, the controller, or both. Feedback signals are provided to the controller to facilitate closed-loop control to maintain desired haptic output.

The feedback sensors can include magnetic, mechanical, and/or electrical sensors for determining characteristics of haptic actuator components, including proximity, position, displacement, velocity, acceleration, force, and the like. For example, sensors may be used to determine the position, velocity, or acceleration of the movable mass within the enclosure of the haptic actuator. Example feedback sensors include capacitive sensors and Hall Effect sensors. A capacitive sensor varies its output voltage based on changes in capacitance, which can be used to determine the aforementioned characteristics of haptic actuator components. A Hall Effect sensor varies its output voltage based on changes in magnetic field, which can be used to determine the aforementioned characteristics of haptic actuator components.

In one embodiment, closed loop control is implemented by determining the counter-electromotive force or back electromotive force (herein, "back-EMF"), or the voltage generated by the motion of the movable mass within the enclosure, which can be used to determine the position of the movable mass at a given time.

Detailed embodiments of these general considerations will now be disclosed in relation to the accompanying figures.

FIG. 1 illustrates an example electronic device 100 that may incorporate a haptic feedback system according to one or more embodiments presented herein. The electronic device 100 includes a device casing 102, a display 104, and a user input button 106. The device casing 102 retains, supports, and/or encloses various components of the electronic device 100, such as a display 104. The display 104 may include a stack of multiple layers (e.g., a display stack) including, for example, and in no particular order: an organic light emitting diode layer, a touch input layer, a force input layer, and so on. Other embodiments can implement the display 104 in a different manner, such as with liquid crystal display technology, electronic ink technology, quantum dot technology, and so on.

The electronic device 100 can also include a processor, memory, power supply and/or battery, network connections, sensors, input/output ports, acoustic elements, haptic elements, digital and/or analog circuits for performing and/or coordinating tasks of the electronic device 100, and so on. For simplicity of illustration, the electronic device 100 is depicted in FIG. 1A without many of these elements, each of which may be included, partially and/or entirely, within the device casing 102 and may be operationally or functionally associated with, or coupled to, the display 104 and/or the user input button 106. Output of the display 104 may vary with operation of the device, receipt of information by the device, input received from an input mechanism (such as button 106), output (such as may be generated by a haptic actuator as described herein), and so on.

Furthermore, although illustrated as a cellular phone, the electronic device 100 can be another electronic device that is either stationary or portable, taking a larger or smaller form factor than illustrated. For example, in certain embodiments (and as noted above), the electronic device 100 can be a laptop computer, a tablet computer, a wearable device, a health monitoring device, a home or building automation device, a home or building appliance, a craft or vehicle entertainment, control, and/or information system, a navigation device, and so on.

Figure 2:
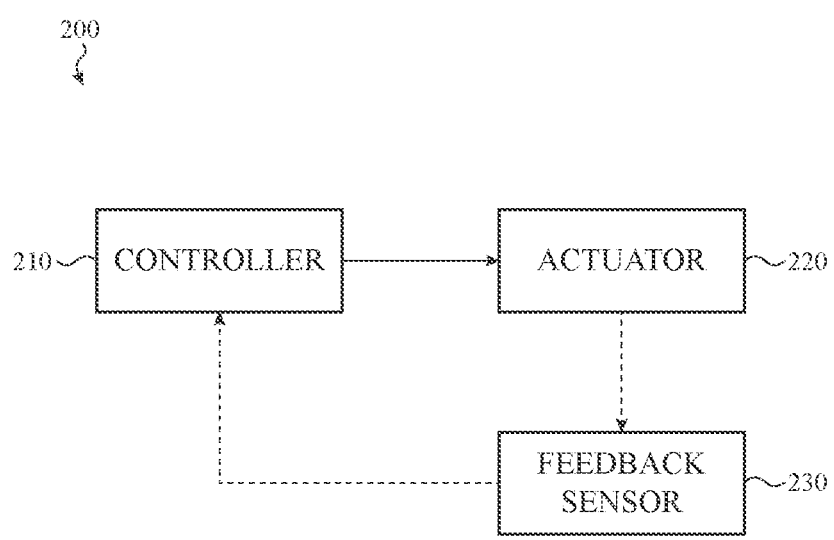
FIG. 2 is a simplified system diagram depicting selected components of a haptic feedback system according to one example embodiment.

FIG. 2 is a simplified system diagram depicting selected components of a haptic feedback system 200 according to one example embodiment. In this example, the haptic feedback system 200 includes a controller 210, an actuator 220, and a feedback sensor 230.

In various embodiments, the controller 210 receives instructions to drive the actuator 220 to generate a haptic output from one or more components of the electronic device. The controller 210 provides a drive signal to drive the actuator 220. Typically, the drive signal is a voltage signal that corresponds to a particular haptic output that can be generated by the actuator 220.

The controller 210 receives feedback signals from the feedback sensor 230 to facilitate closed-loop feedback to achieve a desired haptic output. In many cases, the circuitry of the controller can include one or more signal processing stages which can include, but may not be limited to, amplifying stages, filtering stages, multiplexing stages, digital-to-analog conversion stages, analog-to-digital conversion stages, comparison stages, feedback stages, charge amplification stages, and so on. The controller 210 may be integrated with components of the electronic device, including, for example, the processor, memory, power supply, and so on.

The actuator 220 produces a haptic output based on electrical current (e.g., in the form of drive signals, electromagnetic signals, and the like) received from the controller 210. The actuator 220 may be a linear actuator (such as a linear resonance actuator) that produces a haptic output by linear motion of a mass. The actuator 220 includes an enclosure or housing, one or more magnetic masses (e.g., magnets), and a movable mass that includes a conduction loop (e.g., a wire loop, wound coil, and the like).

The feedback sensor 230 provides feedback signals to the controller 210. Feedback signals can be used by the controller 210 to determine characteristics of the actuator 220 to facilitate closed-loop control to produce a desired haptic output. Characteristics include the position and/or velocity of the movable mass within the enclosure. As an example, consider a situation in which the desired haptic output is consistent with linear motion of the movable mass (i.e., motion along an axis in an x-direction only). The controller 210 may determine from feedback data received by the feedback sensor 230 that there is motion in the y- and/or z-direction that is not consistent with the desired haptic output. In one embodiment, the controller 210 compares expected values for the feedback data to the received feedback data. As a result of this determination the controller 210 may adjust the drive signal (e.g., generate a corrective signal) to correct the unwanted motion and achieve the desired haptic output.

The feedback sensor 230 may include one or more sensors, such as capacitive sensors for measuring changes in capacitance of components of the actuator 220, and/or Hall Effect sensors for measuring changes in a magnetic field of the actuator 220. The feedback sensor 230 may consist of multiple sensors at different locations within and around the actuator 220. The feedback sensor 230 may be integrated with the controller 210, for example as a circuit, processor, algorithm, or the like (e.g., a back electromotive force sensor) configured to determine a back-EMF of the actuator 220, or the voltage generated by the motion of the movable mass within the enclosure, which can be used to determine the position of the movable mass at a given time.

In some embodiments, the haptic feedback system 200 does not include feedback sensors 230. In this embodiment, the controller 210 and the actuator 220 operate in open-loop mode, as opposed to closed-loop or feedback control mode. In this embodiment, the controller 210 generates a desired signal or waveform to produce a haptic output, and the actuator 220 produces the haptic output in response to receiving the desired waveform from the controller.

The actuator 220, the feedback sensor 230, and the components and structure of each are discussed in more detail below with respect to FIGS. 3A-8D.

Figure 3A:
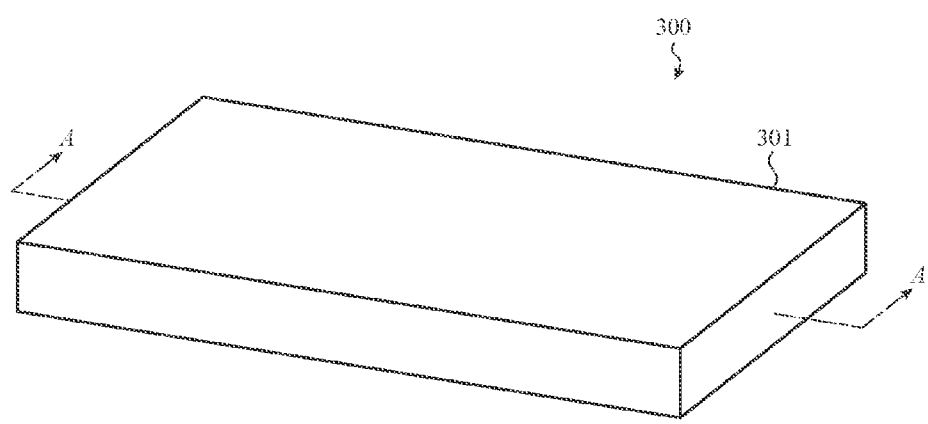
FIG. 3A depicts an example haptic actuator, such as described herein.

FIG. 3A depicts an example construction of a haptic actuator 300, such as described herein. The haptic actuator 300 includes an enclosure 301. In various embodiments, the enclosure 301 is a substantially rectangular housing comprised of a durable material (e.g., stainless steel, titanium, aluminum or other suitable metals, ceramic, certain polymers, and the like). The enclosure 301 may consist of multiple parts, such as a base and a crust, which fit together to form an interior volume within the enclosure. The enclosure 301 may include one or more openings, for example for power delivery components. The enclosure 301 may further include attachment mechanisms for attaching or otherwise integrating the enclosure into the electronic device 100, for example within the device casing 102. Further, the enclosure 301 may include various components that are not pictured in the figures, including electrical transmission components such as flex cables for transmitting signals within the enclosure. The enclosure 301 may further include motion control components, such as stoppers, bump guards, and the like. The motion control components may be used to protect components of the actuator 300 from damage based on the motion within the actuator.

Figure 3B:
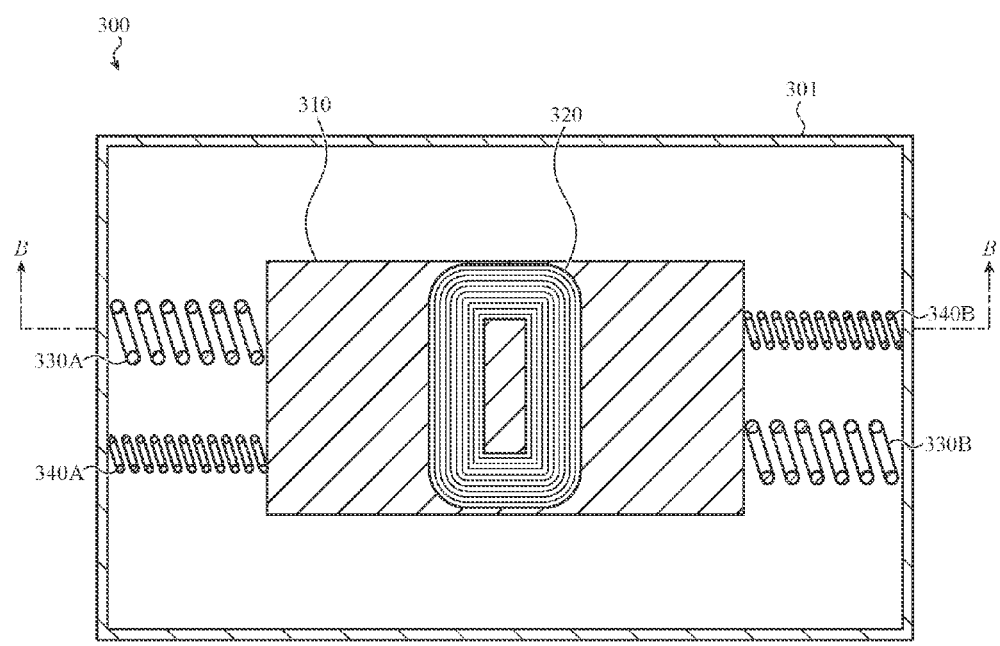
FIG. 3B is a cross-section of the haptic actuator of FIG. 3A, taken through section line A-A of FIG. 3A.
Figure 3C:
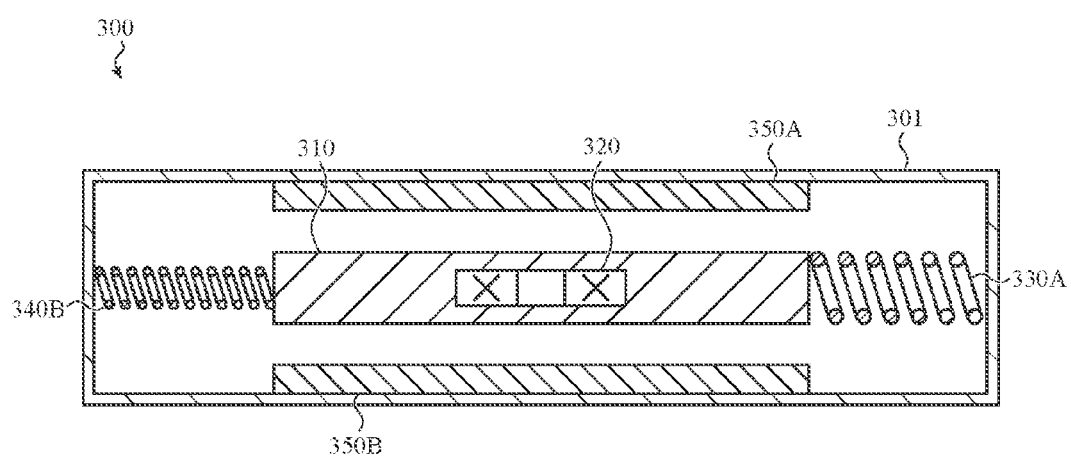
FIG. 3C is a cross-section of the haptic actuator of FIG. 3A, taken through section line B-B of FIG. 3B.

FIG. 3B is a cross-section of the haptic actuator 300, taken through section line A-A of FIG. 3A. The haptic actuator 300 includes a dynamic body 310, a conduction loop 320, movement elastic members 330A-B, conduction elastic members 340A-B, and one or more magnets (not pictured in FIG. 3B). FIG. 3C is a cross-section of the haptic actuator 300, taken through section line B-B of FIG. 3B. FIG. 3C illustrates magnets 350A-B.

The dynamic body 310 is disposed in the interior volume of the enclosure 301 and mechanically coupled to the enclosure 301 by movement elastic members 330, and electrically coupled to the enclosure 301 by conduction elastic members 340. The dynamic body 310 may be made of a high-density material (e.g., greater than 15 grams per cubic centimeter) to maximize the momentum of the mass and thus the strength of the haptic feedback during motion of the actuator. In one embodiment, the dynamic body 310 is made of tungsten.

The conduction loop 320 is coupled (e.g., affixed) to the dynamic body 310 and is electrically coupled to the conduction elastic members 340. The conduction loop 320 may be made of any suitable conductive material that can be energized by an electrical current (e.g., a drive signal or other electromagnetic signal), thereby generating a Lorentz force to cause the dynamic body to move along the longitudinal axis of the enclosure 301 (e.g., the left-to-right and right-to-left directions in FIG. 3B). In one embodiment, the conduction loop 320 is a substantially round loop made of round wire (e.g., copper wire). In another embodiment, as illustrated in FIG. 3B, the conduction loop 320 is an electromagnetic coil that has a rounded-rectangular shape and is made of square or rectangular wire. The conduction loop 320 may extend near or beyond the border of the dynamic body 310. This maximizes the Lorentz force by increasing the strength of the magnetic field generated by the conduction loop 320.

The movement elastic members 330 are elastic members that allow movement of the dynamic body 310 relative to the enclosure 301 and the magnets 350 along a longitudinal axis of the enclosure 301. In the example of FIG. 3B, two movement elastic members 330A-B are shown, but more or fewer movement elastic members may be used in various embodiments. The movement elastic members 330 may be springs, gels, elastomers, or the like made of any suitable elastic material. In one embodiment, the movement elastic members 330 are metal springs (e.g., flexure springs, leaf springs, coil springs, and the like) with a high strength-to-weight ratio such as stainless steel. The movement elastic members 330A-B may be positioned on opposite sides of the longitudinal axis of the enclosure 301 from one another, as illustrated in FIG. 3B. This minimizes movement of the dynamic body 310 in directions other than along the longitudinal axis. For example, the movement elastic members 330 may be connected to or otherwise constrained by the dynamic body 310 at connection locations (e.g., connection points, connection areas) as shown in FIG. 3B. The connection location of movement elastic member 330A may be offset from the longitudinal axis in one direction, and the connection location of the movement elastic member 330B may be offset from the longitudinal axis in another direction.

The conduction elastic members 340 are elastic members that allow for electrical current (e.g., drive signals, electromagnetic signals, and the like) to be transmitted to the conduction loop 320 while the dynamic body 310 is stationary and during movement. As the dynamic body 310 moves within the enclosure 301, the conduction elastic members 340 maintain an electrical connection with both the enclosure 301 and the conduction loop 320. The conduction elastic members 340 may be made of any suitable elastic and conductive material, such as a spring, a doped gel, an elastomer, and the like. In various embodiments, the conduction elastic members 340 are springs (e.g., flexure springs, leaf springs, coil springs, and the like) with relatively high electrical conductivity and yield strength (e.g., Cu-2Ag wire, Cu-4Ag wire, and the like). The conductivity allows for proper transmission of electrical current, including electromagnetic signals, to the conduction loop 320, and the high yield strength allows the conduction elastic members 340 to maintain elasticity over thousands, millions, or more compression and stretching events. The conduction elastic members 340 change shape (e.g., expand and contract, deflect, and the like) as the dynamic body 310 moves within the interior volume of the enclosure, thereby maintaining the electrical connection between the conduction loop 320 and the controller. Similar to the movement elastic members 330, the conduction elastic members 340A-B may be positioned on opposite sides of the longitudinal axis of the enclosure 301 from one another, as illustrated in FIG. 3B. For example, the conduction elastic members 340 may be connected to or otherwise constrained by the dynamic body 310 at connection locations (e.g., connection points, connection areas) as shown in FIG. 3B. The connection location of conduction elastic member 340A may be offset from the longitudinal axis in one direction, and the connection location of the conduction elastic member 340B may be offset from the longitudinal axis in another direction. As shown in FIG. 3B, the conduction elastic members 340 may be positioned relative to the movement elastic members 330 such that the elastic members on the same side of the dynamic body 310 (e.g., movement elastic member 330A and conduction elastic member 340A) are located on opposite sides of the longitudinal axis. For example, the movement elastic member 330A may be offset from the longitudinal axis in one direction and the conduction elastic member 340A may be offset from the longitudinal axis in another direction.

In one embodiment, the reaction force (e.g., spring force) of the movement elastic members 330 is significantly greater than the reaction force of the conduction elastic members 340. For example, the reaction force of the movement elastic members 330 may be approximately 0.5-3 N/mm, and the reaction force of the conduction elastic members 340 may be approximately 0.001-0.01 N/mm. As a result, the effect of the conduction elastic members 340 on the movement of the dynamic body 310 is negligible compared to the effect of the movement elastic members 330.

The magnets 350 are coupled to the enclosure 301 and generate a magnetic field within the interior volume of the enclosure 301. The magnetic field results in a Lorentz force on the conduction loops 320 that causes the dynamic body 310 to move within the interior volume of the enclosure 301. The magnets 350 may be any suitable magnetic mass, such as permanent magnets, electromagnets, or the like. In various embodiments, the magnets 350 are arranged in planar arrays in which adjacent magnets have alternating polarities. This causes the magnetic flux to be augmented on one side and reduced on another, and can be used to confine the magnetic flux within the interior volume of the enclosure 301 to avoid interactions with other components of the electronic device. Example magnetic arrays are discussed in more detail below with respect to FIGS. 5A-F.

In operation, the actuator 300 receives an input signal (e.g., a drive signal, electromagnetic signal, or other electrical current) from a controller of the electronic device and generates a haptic output. The controller is electrically coupled to the conduction elastic members 340, for example by a flex cable partially or entirely within the enclosure 301. The conduction elastic members 340 convey the input signal to the conduction loop 320. The signal energizes the conduction loop 320, which generates a magnetic field. The interaction of this magnetic field with the magnets 350 causes a force on the conduction loop 320, and thereby the dynamic body 310, along an x-axis or longitudinal axis (left-to-right with reference to FIGS. 3B and 3C). This force causes the dynamic body 310 to move along the longitudinal axis ("linear motion"). The movement elastic members 330 constrain the movement of the dynamic body 310 by imparting a reaction force (e.g., spring force) on the dynamic body 310. This causes the dynamic body 310 to oscillate along the longitudinal axis within the enclosure 301. The movement of the dynamic body 310 within the enclosure 301 results in a haptic output that can be felt by a user of the electronic device.

Movement of the dynamic body 310 in directions other than along the longitudinal axis is possible, but in general not desired. This is because such movement results in wasted energy, thereby reducing the efficiency of the actuator 300. Additionally, such movement can cause the dynamic body 310 to contact the enclosure 301 and other components of the actuator 300, resulting in damage, unwanted noise, interference with haptic outputs, and the like. Various aspects of the actuator 300 constrain movement in the y-direction (top-to-bottom with reference to FIG. 3B), the z-direction (top-to-bottom with reference to FIG. 3C), or some combination of the x-, y-, and z-directions (e.g., twisting or rolling). Movement in the y- and z-directions, including translation, twisting, and rolling, is constrained by the presence of the movement elastic members on opposite sides of the longitudinal axis of the dynamic body 310. Movement in the y-direction is additionally constrained by the relative positions of the movement elastic members 330A and 330B, for example diagonally across from one another as illustrated in FIG. 3B. This positioning generally minimizes y-direction movement, including situations in which the dynamic body 310 contacts the enclosure 301. Movement in the z-direction may be constrained by a viscous fluid damper between the dynamic body 310 and one or more of the magnets 350, as discussed in more detail below with respect to FIGS. 4A-4C. Additionally, physical mechanisms may constrain the movement of the dynamic body 310 in any direction. For example, stops made of an elastic material (e.g., rubber, silicone, and the like) may be placed within the enclosure to constrain movement. In another embodiment, the enclosure 301 may include one or more shafts (not pictured) that constrain the movement of the dynamic body 310. For example, the dynamic body 310 may be disposed around a shaft that causes the dynamic body 310 to move in the x-direction. Alternatively or additionally, one or more shafts within the enclosure 301 may guide or restrict the motion of the dynamic body 310.

Figure 4A:
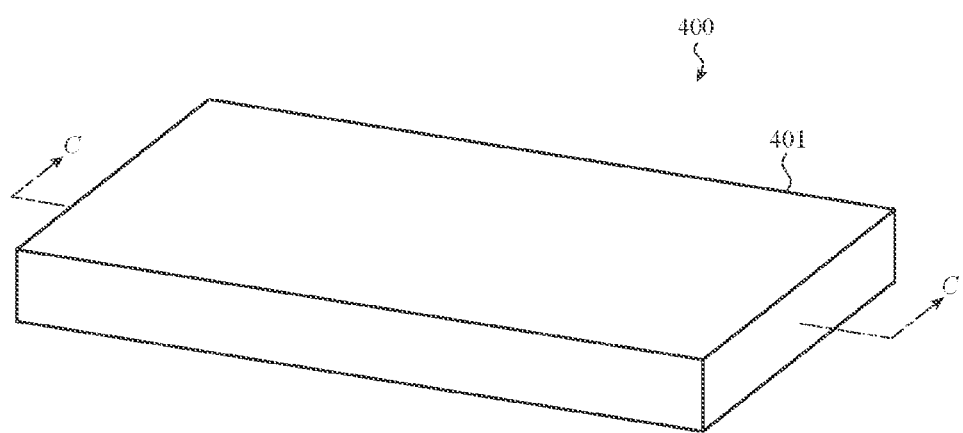
FIG. 4A depicts a second example haptic actuator, such as described herein.
Figure 4B:
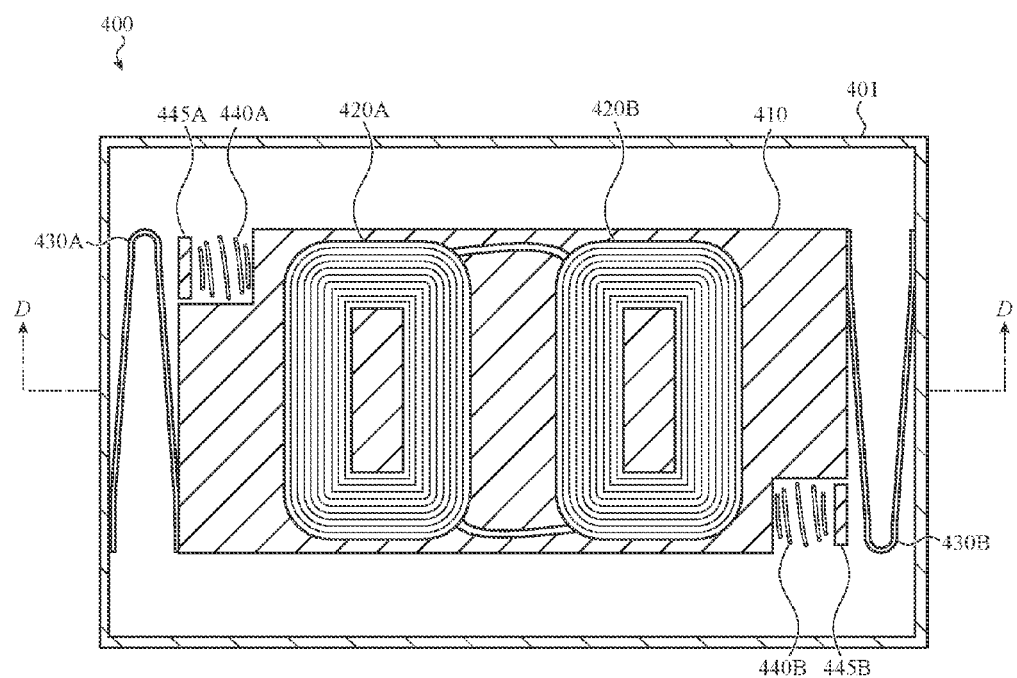
FIG. 4B is a cross-section of the haptic actuator of FIG. 4A, taken through section line C-C of FIG. 4A.
Figure 4C:
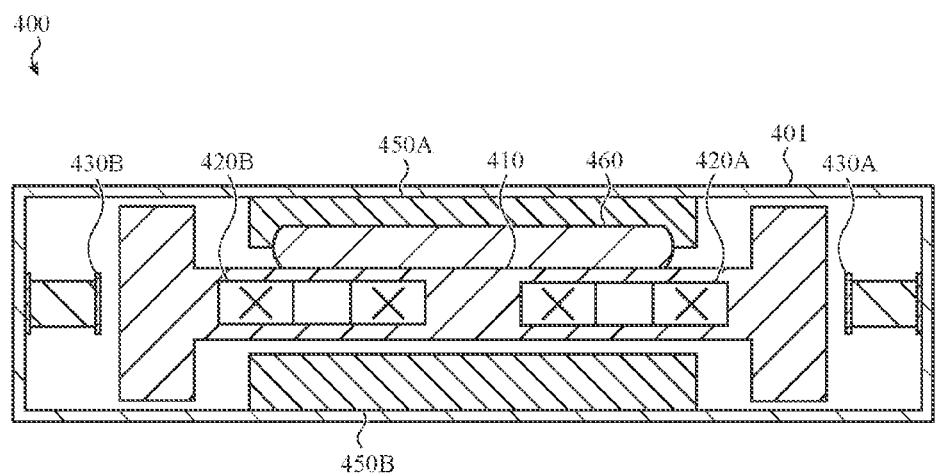
FIG. 4C is a cross-section of the haptic actuator of FIG. 4A, taken through section line D-D of FIG. 4B.

FIG. 4A depicts a second example construction of a haptic actuator, such as described herein. The haptic actuator 400 of FIG. 4A includes an enclosure 401 that defines an interior volume. FIG. 4B is a cross-section of the haptic actuator 400, taken through section line C-C of FIG. 4A. The haptic actuator 400 includes a movable body 410 (similar to the dynamic body 310 of FIGS. 3A-3C), electromagnetic coils 420A-B, motion springs 430A-B, contact springs 440A-B, and one or more magnets (not pictured in FIG. 4B). FIG. 4C is a cross-section of the haptic actuator 400, taken through section line D-D of FIG. 4B. FIG. 4C illustrates magnets 450A-B.

The haptic actuator 400 is similar to the haptic actuator 300 discussed above with respect to FIGS. 3A-3C. In addition to the features and characteristics of the haptic actuator 300, the haptic actuator 400 includes various additions and variations. The electromagnetic coils 420A-B are rounded rectangular coils that are made of rectangular or square wire of any suitable conductive material (e.g., copper, nickel, gold, and the like). As used herein, the term "rounded rectangular" or "rounded rectangle" refers to a shape with straight sides and rounded corners. The rectangular coils and rectangular wire of the electromagnetic coils 420 allow for more material to fit in a smaller space, thereby helping to minimize the size of the actuator 400. The electromagnetic coils 420 may be oriented within the enclosure 401 parallel to the magnets 450A-B.

The movable body 410 includes an inner portion that is relatively thin compared to outer portions, as illustrated in FIG. 4C. The inner portion is relatively thin so that it may be positioned between the magnets 450 while minimizing the thickness of the actuator 400. The outer portions are thicker to add weight to the movable body 410, the movement of which creates a stronger haptic output.

The motion springs 430 are flexure springs and are positioned in opposite orientations to minimize non-linear motion of the movable body 410. The flexure springs have a general wishbone shape and flex during compression and stretching. Flexure springs provide several advantages for the actuator 400. First, flexure springs have a high spring constant for a relatively small distance between the ends of the spring. This allows the springs to take up less space within the enclosure 401, and in particular along the actuation axis, as illustrated in FIG. 4B, thereby helping to minimize the size of the actuator 400. Further, the flexure springs help to minimize the non-linear motion of the movable body 410 because they are relatively rigid in the y- and z-directions. As discussed above with respect to FIGS. 3A-3C, minimizing non-linear motion is advantageous for the efficiency and operation of the actuator 400.

The contact springs 440 are coiled wire springs with a "beehive" shape (i.e., the center of the spring is wider than the ends). This concentrates the peak stress at the center of the coil and away from the connections (e.g., solder joints) with the enclosure 401. As a result, potential failures along the connections are mitigated, leading to increased lifespan and reliability of the actuator 400. In one embodiment, the diameter of the spring is small (e.g., approximately 50 micrometers) to minimize the spiral spring torsion force applied to the mass by the contact springs 440. This minimizes the unwanted movement of the movable body 410 discussed above. Similarly, each of the two contact springs 440A and 440B may have opposing coil directions to offset the spiral spring tension force. The contact springs 440 are constructed from a material with high conductivity for providing signals to the electromagnetic coils 420, and high yield strength to avoid failure of the springs as a result of fatigue. Example materials include copper-silver wire (e.g., CU-2Ag or CU-4Ag), annealed or rolled HA copper foil, TPC wire, C7024-XSH foil, NKC388-USH strip, C7035-XV foil, NKT322-ESH strip, C1990-GSH foil, BF 158 strip or foil, electroformed Co—P, and Cu-0.3% Sn.

The contact springs 440 are connected to the enclosure by contacts 445A and 445B. The contacts 445 additionally constrain the movement of the contact springs 440 by opposing the spring force of the contact springs. In one embodiment, as illustrated in FIG. 4B, a contact 445 constrains the movement of a contact spring 440 by constraining an end of the contact spring. In various embodiments, the contacts 445 are rigid members that are electrically connected to the controller, for example by flex cables or the like.

The haptic actuator 400 additionally includes fluid 460 that acts as a damper to help control the movement of the movable body 410. In one embodiment, the fluid 460 is a magnetized fluid or ferrofluid. In this embodiment, the fluid 460 may direct magnetic flux toward the movable body 410 to increase the efficiency of the haptic actuator 400 by requiring a smaller input signal amplitude to achieve the same electrical current in the electromagnetic coils 420. The ferrofluid also has the advantage of being held in place by magnetic forces from the magnet, and thus does not require additional structure or mechanisms for containment, which allows for less overall complexity, weight, and volume of the haptic actuator 400. The fluid 460 dampens linear movement of the movable body 410 to improve the control of the linear movement. For example, the fluid 460 allows faster attenuation of oscillation, which makes possible shorter haptic output events that are more noticeable to users. Further, the fluid 460 may dampen movement in the y- and z-directions as discussed above with respect to FIGS. 3A-3C, which improves the function and reliability of the actuator 400.

Figure 5A:
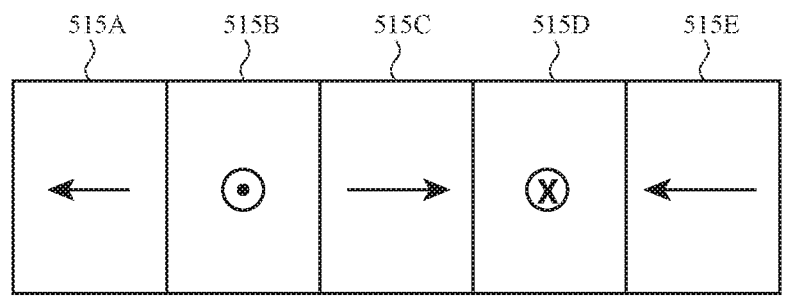
FIGS. 5A-5H depict example configurations for magnet arrays in haptic actuators, such as those described herein.
Figure 5B:
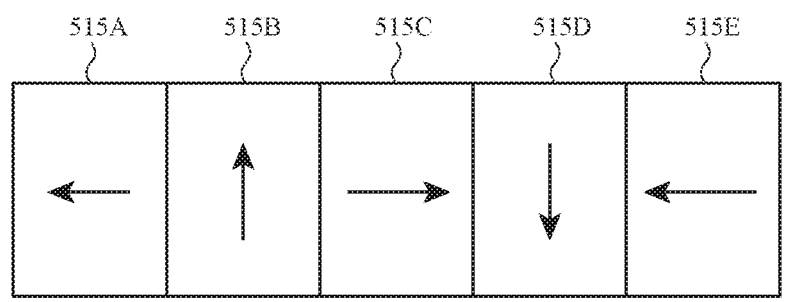

FIGS. 5A-5F depict example configurations for magnet arrays in haptic actuators, such as those described herein. FIG. 5A depicts a top view of an example Halbach array 510A. FIG. 5A includes magnets 515A-E, which have differing magnetic field directions as illustrated by the indicators. FIG. 5B depicts a side view of the Halbach array of FIG. 5A. FIG. 5B also depicts the differing magnetic field directions of the adjacent magnets. The result of the arrangement of the magnets in FIGS. 5A and 5B is a decreased magnetic flux on the top of the array, and an increased magnetic flux on the bottom of the array. A similar array may be used as the magnets described herein to direct magnetic flux toward the conduction loops or electromagnetic coils of the haptic actuator.

Figure 5C:
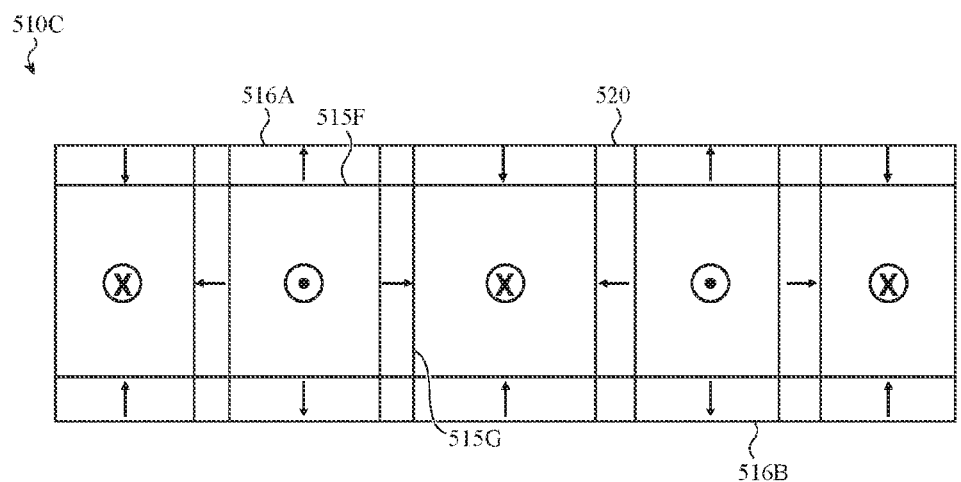

FIG. 5C depicts a top view of a second example Halbach array 510C. The Halbach array 510C is similar to the Halbach array 510A. The Halbach array of FIG. 5C includes different sized magnets, such as magnets 515F and 515G. This has an advantage of saving space, thereby reducing the overall size of the actuator. The Halbach array 510C includes additional magnets, such as 516A and 516B on the sides of the magnets 515 to further augment the magnetic flux. The Halbach array 510C additionally includes spacers 520 to further direct the magnetic field. In one embodiment, the spacers are a non-ferrous material (e.g., aluminum). In another embodiment, the spacers are magnetic.

Figure 5D:
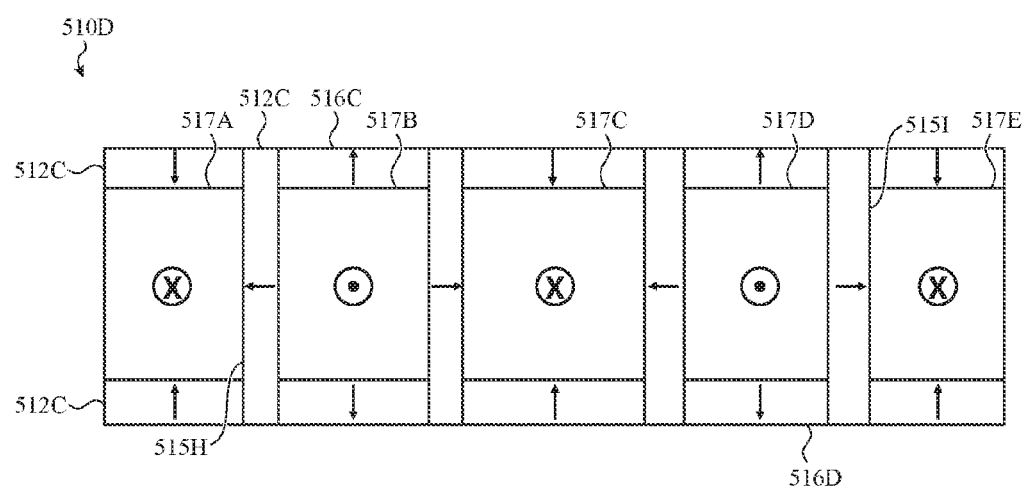

FIG. 5D depicts a top view of a third example Halbach array 510D. The Halbach array 510D is similar to the Halbach array 510C, but the smaller magnets 515 (such as 515H and 515I) extend between the magnets 516, so spacers are not needed. This has the advantage of reducing the complexity and number of components of the Halbach array 510D as compared to, for example, the Halbach array 510C.

Figure 5E:
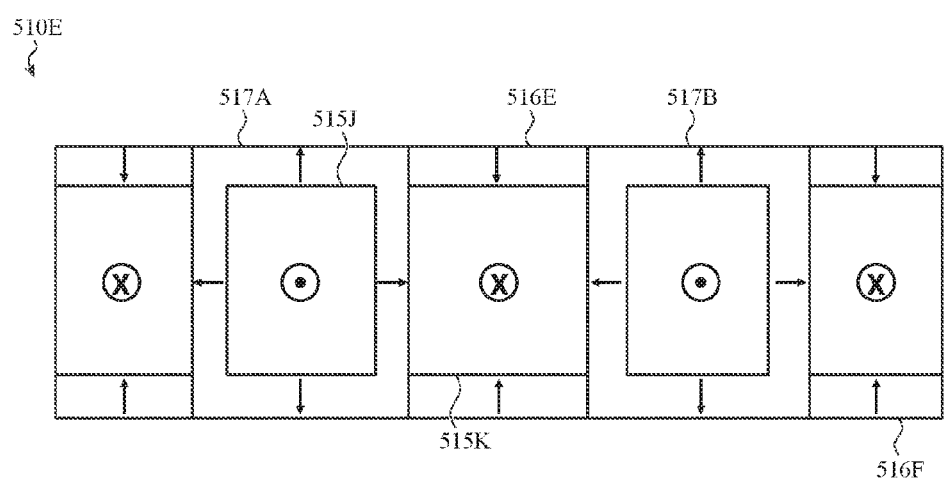

FIG. 5E depicts a top view of a fourth example Halbach array 510E. The Halbach array 510E is similar to the Halbach arrays 510C and 510D, and includes magnets 515, such as 515J and 515K, and magnets 516, such as magnets 516E and 516F. The Halbach array 510E additionally includes magnets 517A and B, which are loop magnets which have magnetic fields in the direction away from the center of the loop. The loop magnets 517 function similarly to the separate magnets 515 and 516, but this configuration has the advantage of reducing the number of components of the Halbach array compared to arrays 510C and 510D.

Figure 5F:
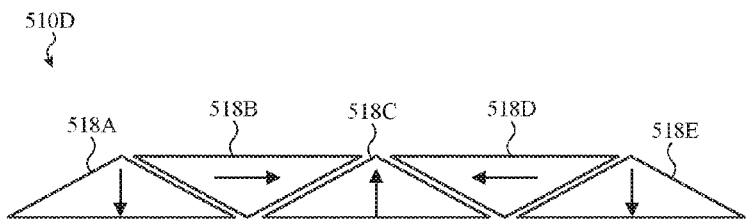
Figure 5G:
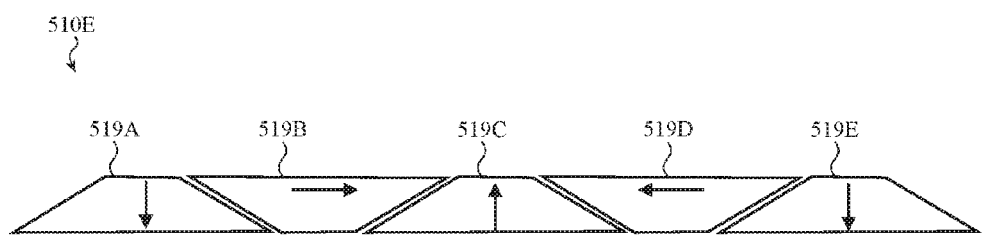
Figure 5H:
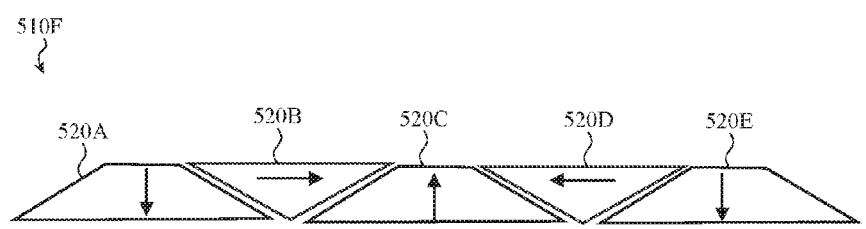

FIG. 5F depicts a side view of a fifth example Halbach array 510F. The Halbach array 510F includes magnets 518A-E with alternating magnetic field directions similar to magnets 515A-E of FIG. 5B. Magnets 518A-E have triangular cross-sections, which further increases the augmentation effect on the magnetic flux compared to arrays 510A-E. FIG. 5G depicts a side view of a sixth example Halbach array 510G. The Halbach array 510G includes magnets 519A-E with alternating magnetic field directions similar to magnets 515A-E of FIG. 5B. Magnets 519A-E have trapezoidal cross-sections, which, similar to array 510F, further increases the augmentation effect on the magnetic flux compared to arrays 510A-E. FIG. 5H depicts a side view of a sixth example Halbach array 510H. The Halbach array 510H includes magnets 520A-E with alternating magnetic field directions similar to magnets 515A-E of FIG. 5B. Magnets 520A-E have trapezoidal or triangular cross-sections similar to the magnets of arrays 510F and 510G. Similar to arrays 510F and 510G, the cross-section shapes further increase the augmentation effect on the magnetic flux compared to arrays 510A-E. The magnets described above with respect to FIGS. 5A-5H may be any suitable magnetic mass, such as electromagnets, permanent magnets, temporary magnets, and the like.

Figure 6A:
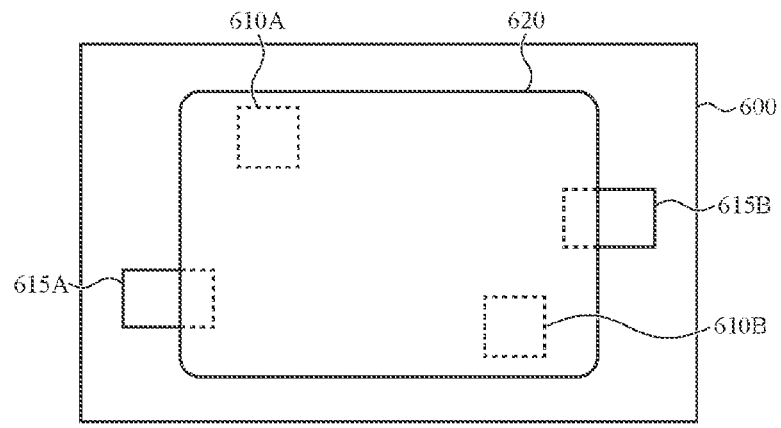
FIGS. 6A-6C depict an example configuration for capacitive sensors within a haptic actuator, such as described herein.
Figure 6B:
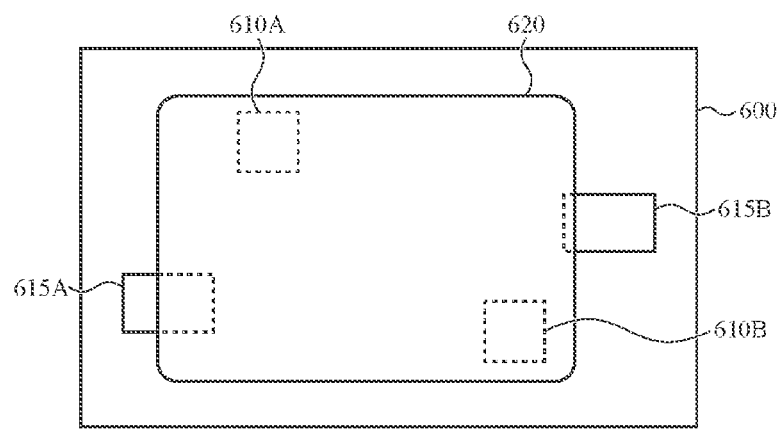
Figure 6C:
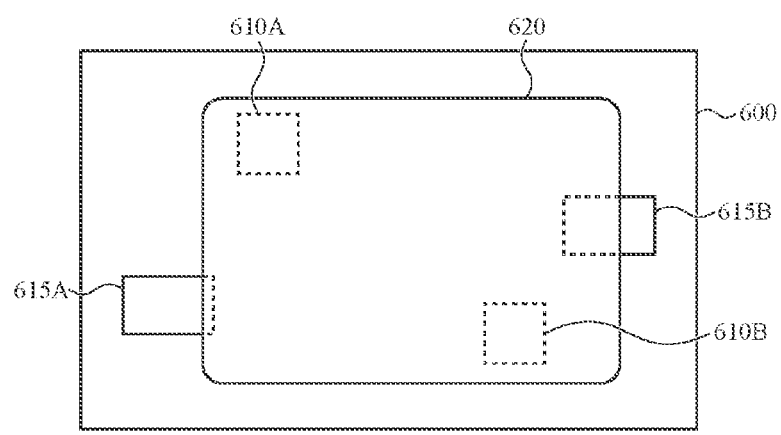

FIGS. 6A-6C depict an example configuration of capacitive sensors within a haptic actuator, such as described herein. In the example of FIGS. 6A-6C, movable body 620 moves within enclosure 600 from a first position (FIG. 6A) to a second position (FIG. 6B) to a third position (FIG. 6C). The first position may be, for example, a neutral position of the movable body 620 prior to a signal being provided to generate a haptic output or a position during movement (e.g., oscillation) of the movable body 620. The second position is a leftward position during movement of the movable body 620. The third position is a rightward position during movement of the movable body 620. Capacitive sensors 610A-B and 615A-B detect changes in capacitance based on the position or motion of the movable body 620, which can be used to determine a relative position of the movable body 620 within the enclosure. In various embodiments, the movable body 620 acts as a capacitive plate, the motion of which results in changes in the sensed capacitance by the capacitive sensors 610 and 615. In the example of FIGS. 6A-6C, four capacitive sensors 610, 615 are employed, but in other embodiments, more or fewer sensors may be employed Capacitive sensors 610 are configured to measure the position of the movable body 620 in the z-direction (into and out of the page with reference to FIGS. 6A-6C). During motion of the movable body 620, the movable body continuously covers capacitive sensors 610. As a result, the x-position (left and right with reference to FIGS. 6A-6C) of the movable body does not affect the capacitance detected by the capacitive sensors 610. Accordingly, any changes in capacitance detected by the capacitive sensors 610 can be attributed to changes in the z-position of the movable body 620. Additionally, because there are two capacitive sensors 610A and 610B for measuring the z-position, differences in the readings can be used to determine roll (e.g., the top edge in FIG. 6A is higher or lower than the bottom edge), pitch (e.g., the left edge in FIG. 6A is higher or lower than the right edge), and combinations thereof. This information can be relayed to the controller to adjust the signals sent to the actuator to mitigate non-linear movement.

Capacitive sensors 615 are configured to measure (e.g., determine) the position of the movable body 620 in the x-direction (left and right with reference to FIGS. 6A-6C). During motion of the movable body 620, the border of the movable body moves over the capacitive sensors 615. As a result, the x-position of the movable body 620 changes the capacitance detected by sensors 615. Accordingly, changes in capacitance can be attributed to changes in the x-position of the movable body 620. In various embodiments, the z-position changes measured by sensors 610 can be factored into the measurements by the sensors 615 to more accurately determine the x-position of the movable body 620. Similar to above, differences in the readings between the two capacitive sensors 615A and 615B can be used to determine pitch, roll and combinations thereof.

For example, the measured capacitance of each of the four capacitive sensors 610 will be different between FIGS. 6A and 6B based on the position of the movable body 620. Using four capacitive sensors 610 allows for determination of the position of the movable body in the x-direction (left to right in FIG. 6A), movement in the y- and z-directions, as well as "roll" (i.e., deviation from the plane) of the movable body 620.

Figure 7A:
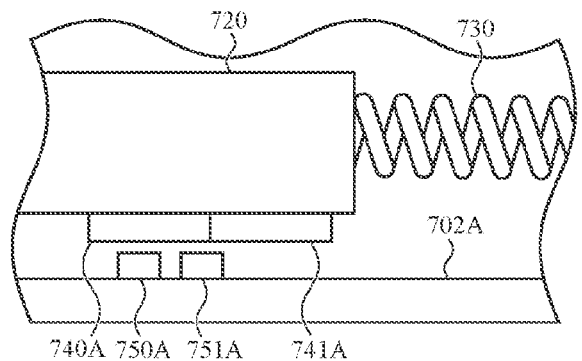
FIGS. 7A-7C depict example configurations for magnetic sensors within a haptic actuator such as those described herein.
Figure 7B:
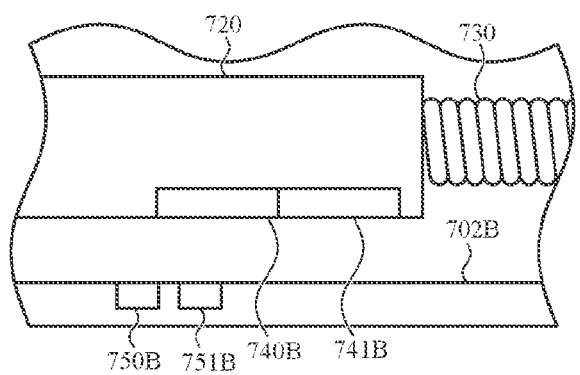
Figure 7C:
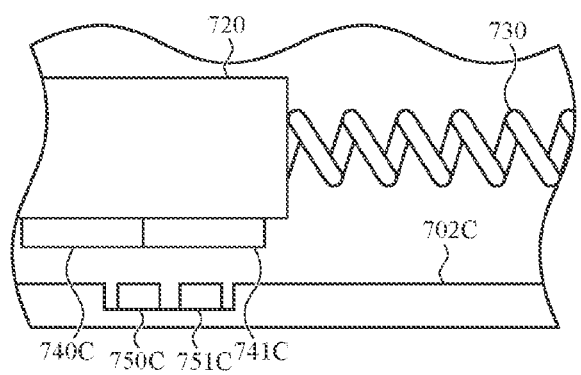

FIGS. 7A-7C depict an example configuration of magnetic sensors within a haptic actuator such as those described herein. In the example of FIGS. 7A-7C, movable mass 720 moves within an enclosure from a first position (FIG. 7A) to a second position (FIG. 7B) to a third position (FIG. 7C). The first position may be, for example, a neutral position of the movable mass 720 prior to a signal being provided to generate a haptic output or a position during movement (e.g., oscillation) of the movable mass 720. The second position is a rightward position during compression of a spring 730 during oscillation of the movable mass 720. The third position is a leftward position during compression of a spring 730 during oscillation of the movable mass 720.

Magnets 740, 741 are coupled to the movable mass 720 such that they move with the movable mass. The magnets 740 may be permanent magnets, electromagnets, or the like. In the example of FIGS. 7A-7C, two magnets 740 are shown, but more or fewer magnets may be used. The magnets 740, 741 may be attached to and/or protrude (partially or entirely) from an edge of the movable mass 720 as illustrated by magnets 740A, 741A in FIG. 7A. The magnets 740, 741 may also be attached to or otherwise disposed within the movable mass 720 such that the surface of the magnets is flush with the surface of the movable mass 720, as illustrated by magnets 740B, 741B in FIG. 7B. The magnets 740 may be dipole magnets oriented opposite each other to create differing magnetic fields that can be detected by the Hall Effect sensors 750. For example, with reference to FIGS. 7A-7C, magnet 740A may be oriented with a north pole facing down while magnet 740B may be oriented with a south pole facing down such that the magnetic flux around each is different and capable of detection and differentiation.

Hall Effect sensors 750, 751 are coupled to a surface of a wall 702 within the enclosure of the haptic actuator such that the movable mass 720 and the magnets 740 move relative to the sensors 750. The Hall Effect sensors 750 detect changes in magnetic flux caused by movement of the magnets 740. These detected changes can be used to determine the position of the movable mass 720. In one embodiment, as shown in FIGS. 7A-7C, sensor 750 is located under the magnet 740 such that the magnet 740 is always above the sensor 750, even during motion of the movable mass 720. In this configuration, the sensor 750 primarily detects the magnetic flux of the magnet 740 and the effects of the magnet 741 are negligible. Accordingly, the motion of the movable mass 720 in the x-direction (left to right with reference to FIGS. 7A-7C) does not materially affect the magnetic flux detected by the sensor 750. As a result, changes in magnetic flux detected by the sensor 750 can be attributed to changes in the z-position (up and down with reference to FIGS. 7A-7C) of the movable mass 720. In contrast, as shown in FIGS. 7A-7C, the sensor 751 is positioned such that it may be under magnet 740, magnet 741, or both depending on the x-position of the movable mass 720. Because the magnets 740, 741 have different magnetic flux than one another, the flux detected by the sensor 751 can be used to determine the x-position of the movable mass 720. In various embodiments, the z-position determined by the sensor 750 may be used to adjust the reading by the sensor 751 for a more accurate determination of the x-position.

Referring to FIG. 7A, sensors 750, 751 may be attached to and/or protrude (partially or entirely) from a surface of the enclosure wall 702A as illustrated by sensors 750A, 751A. Referring to FIG. 7B, sensors 750, 751 may be attached to or otherwise disposed within the enclosure wall 702B such that the surface of each sensor is flush with the surface of the enclosure wall 702B, as illustrated by sensors 750B, 751B. Referring to FIG. 7C, sensors 750, 751 may be disposed within a recessed area of the enclosure wall 702C as illustrated by sensors 750C, 751C.

In the example of FIGS. 7A-7C, Hall Effect sensors are used to measure changes in the magnetic field. In various embodiments, different types of sensors may be used in place of the sensors discussed above, including anisotropic magnetoresistance (AMR) sensors, giant magnetoresistance (GMR) sensors, and tunneling magnetoresistance (TMR) sensors.

Figure 8A:
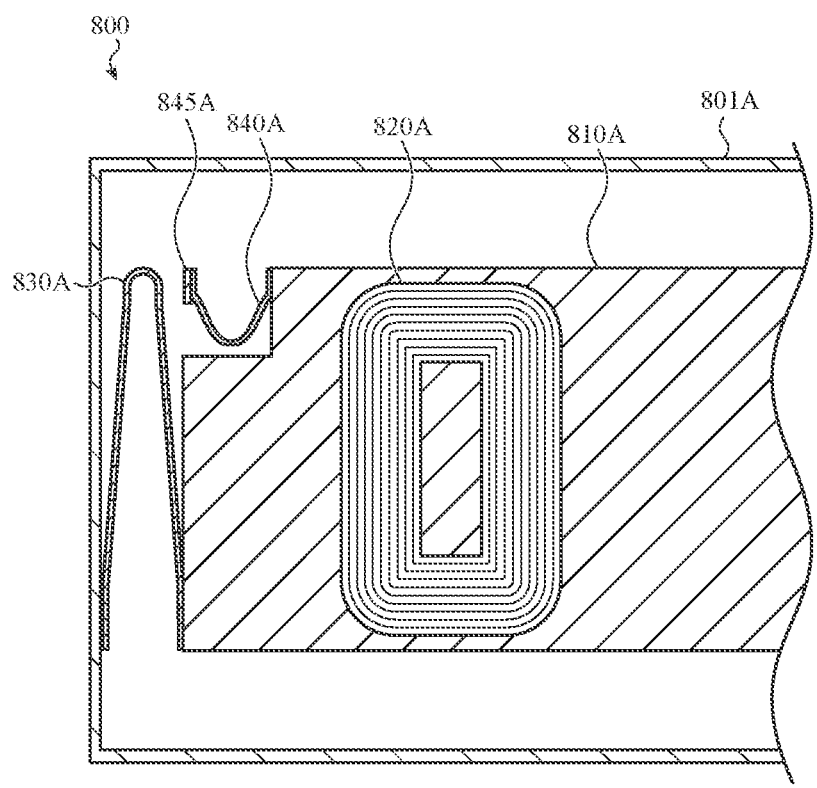
FIGS. 8A-8C are cross-sections similar showing portions of example haptic actuators, such as those described herein.
Figure 8B:
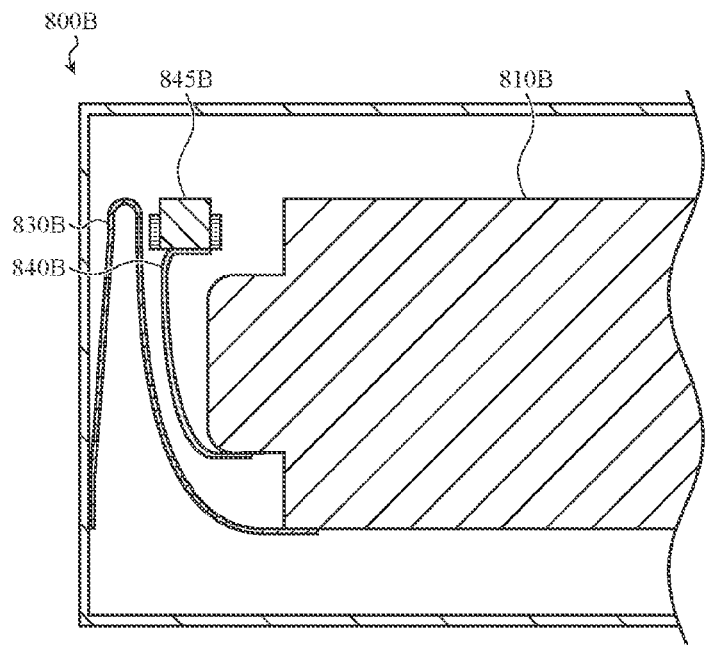
Figure 8C:
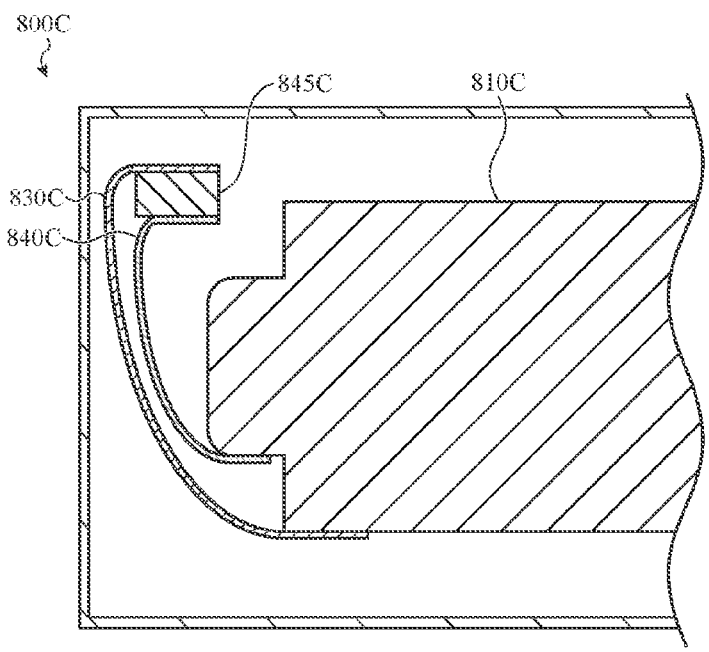

FIG. 8A-8C are cross-sections similar showing portions of example haptic actuators, such as those described herein. FIG. 8A is a cross-section of a first example haptic actuator 800A. The haptic actuator 800A includes an enclosure 801A, a dynamic body 810A, a conduction coil 820A, a motion spring 830A, a contact spring 840A, and an electrical contact 845A. The haptic actuator 800A is similar in form and function to the haptic actuator 400 of FIGS. 4A-C, but the haptic actuator 800A has one motion spring 830A and one contact spring 840A instead of two. FIG. 8B is a cross-section of a second example haptic actuator 800B. The haptic actuator 800B includes a movement elastic member 830B, which is a flexure spring that is attached at a bottom edge of the dynamic body 810B. The attachment of the flexure spring to various surfaces of dynamic body 810B is envisioned. Additionally, the conduction elastic member 840B is a c-shaped elastic member such as a leaf spring. Various forms of elastic members and combinations thereof for the movement elastic members and the conduction elastic members are envisioned. Further, as illustrated in FIGS. 8A-8C, the conduction elastic member 840B may be attached to the contact 845B at various locations. FIG. 8C is a cross-section of a second example haptic actuator 800C. The haptic actuator 800C includes a motion spring 830C, which is a c-shaped spring such as a leaf spring that is attached at a bottom edge of the dynamic body 810C. Additionally, the contact spring 840C is a c-shaped elastic member such as a leaf spring.

Figure 9:
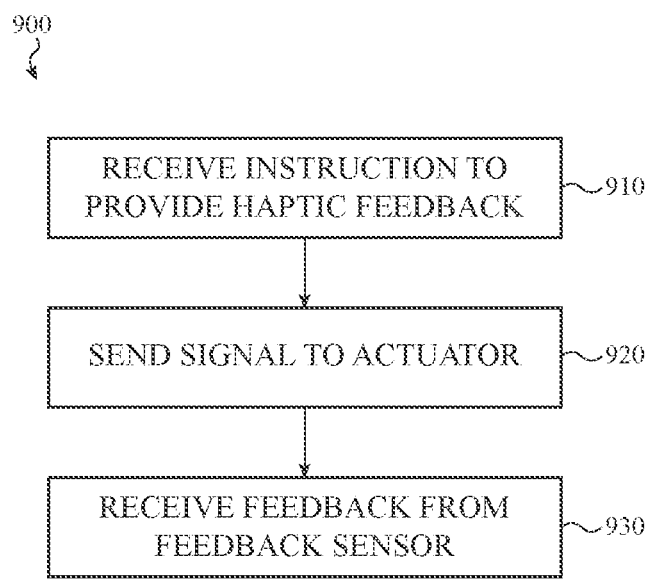
FIG. 9 is a simplified flow chart depicting example operations of a haptic feedback system, such as described herein.

FIG. 9 is a simplified flow chart depicting example operations of a haptic feedback system, such as described herein. The method 900 includes operation 910 in which a controller receives an instruction to provide haptic feedback, for example using a haptic actuator of an electronic device. Next, at operation 920, the controller sends a signal to an actuator (e.g., a haptic actuator) that causes the actuator to output haptic feedback. Then, at operation 930, the controller receives feedback from a feedback sensor associated with the actuator, which may be used to facilitate closed-loop control of the actuator.

As noted above, many embodiments described herein reference a haptic feedback system operated in conjunction with a portable electronic device. It may be appreciated, however, that this is merely one example; other configurations, implementations, and constructions are contemplated in view of the various principles and methods of operation— and reasonable alternatives thereto—described in reference to the embodiments described above.

For example, without limitation, a haptic feedback system can be additionally or alternatively associated with: a display surface, a housing or enclosure surface, a planar surface, a curved surface, an electrically conductive surface, an electrically insulating surface, a rigid surface, a flexible surface, a key cap surface, a trackpad surface, a display surface, and so on. The interface surface can be a front surface, a back surface, a sidewall surface, or any suitable surface of an electronic device or electronic device accessory. Typically, the interface surface of a multimode force interface is an exterior surface of the associated portable electronic device but this may not be required.

Further, although many embodiments reference a haptic feedback system in a portable electronic device (such as a cell phone or tablet computer) it may be appreciated that a haptic feedback system can be incorporated into any suitable electronic device, system, or accessory including but not limited to: portable electronic devices (e.g., battery-powered, wirelessly-powered devices, tethered devices, and so on); stationary electronic devices; control devices (e.g., home automation devices, industrial automation devices, aeronautical or terrestrial vehicle control devices, and so on); personal computing devices (e.g., cellular devices, tablet devices, laptop devices, desktop devices, and so on); wearable devices (e.g., implanted devices, wrist-worn devices, eyeglass devices, and so on); accessory devices (e.g., protective covers such as keyboard covers for tablet computers, stylus input devices, charging devices, and so on); and so on.

Although specific electronic devices are shown in the figures and described herein, the haptic actuators described herein may be used with various electronic devices, mechanical devices, electromechanical devices and so on. Examples of such include, but are not limited to, mobile phones, personal digital assistants, time keeping devices, health monitoring devices, wearable electronic devices, input devices (e.g., a stylus, trackpads, buttons, switches, and so on), a desktop computer, electronic glasses, steering wheels, dashboards, bands for a wearable electronic device, and so on. Although various electronic devices are mentioned, the haptic actuators and linear actuators disclosed herein may also be used in conjunction with other products and combined with various materials.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An electronic device comprising:
a device casing;
a display coupled to the device casing;
an actuator coupled to the device casing and for providing haptic feedback through the device casing, the actuator comprising:
 an enclosure that forms an interior volume;
 a magnet attached to the enclosure, the magnet configured to generate a first magnetic field in the interior volume;
 a movable mass disposed in the interior volume, the movable mass configured to oscillate within the interior volume along a longitudinal axis of the enclosure;
 a conduction loop affixed to the movable mass and operative to generate a second magnetic field in response to an electromagnetic signal;
 a movement elastic member disposed between the movable mass and the enclosure and configured to exert a force on the movable mass, the force varying with a position of the movable mass; and
 a conduction elastic member coupled to the enclosure and the conduction loop, the conduction elastic member configured to convey the electromagnetic signal; and
a controller coupled to the conduction loop by the conduction elastic member and configured to initiate the electromagnetic signal to the conduction loop.

2. The electronic device of claim 1, wherein:
the magnet is a first magnet;
the movement elastic member is a first movement elastic member;
the conduction elastic member is a first conduction elastic member; and
the actuator further comprises:
 a second magnet attached to the enclosure, the movable mass located between the first magnet and the second magnet, the second magnet configured to generate a third magnetic field in the interior volume;
 a second conduction elastic member coupled to the enclosure and the conduction loop;
 a first contact attached to the enclosure and the first conduction elastic member, the first contact configured to constrain an end of the first conduction elastic member;
 a second contact attached to the enclosure and the second conduction elastic member, the second contact configured to constrain an end of the second conduction elastic member;
 a second movement elastic member disposed between the movable mass and the enclosure; further wherein:
  the first movement elastic member is a first flexure spring connected to a first connection location of the movable mass, the first connection location offset from the longitudinal axis in a first direction;
  the second movement elastic member is a second flexure spring connected to a second connection location of the movable mass, the second connection location offset from the longitudinal axis in a second direction, the second direction different from the first direction;
  the first conduction elastic member is a first beehive spring connected to a third connection location of the movable mass, the third connection location offset from the longitudinal axis;
  the second conduction elastic member is a second beehive spring connected to a fourth connection location of the movable mass, the fourth connection location offset from the longitudinal axis;
  the conduction loop comprises two rounded rectangular coils; and
  the first and second conduction elastic members expand and contract as the movable mass moves.

3. The electronic device of claim 1, wherein the magnet comprises a Halbach array.

4. The electronic device of claim 1, wherein the movable mass comprises a first portion disposed within a second portion, the first portion thinner than a second portion.

5. The electronic device of claim 1, wherein the movement elastic member has a spring force between 0.5 and 3 N/mm.

6. The electronic device of claim 5, wherein the conduction elastic member has a spring force between 0.001-0.01 N/mm.

7. The electronic device of claim 1, wherein the actuator further comprises a ferrofluid disposed between the first magnet and the movable mass.

8. An actuator for providing haptic feedback in an electronic device, the actuator comprising:
an enclosure defining a first side and a second side opposite the first side;
a first magnet coupled to the first side of the enclosure;
a second magnet coupled to the second side of the enclosure;
a movable mass disposed between the first and second magnets;
a conduction loop connected to the movable mass;
a first movement elastic member attached to the enclosure and to a first connection location of the movable mass;
a second movement elastic member attached to the enclosure and to a second connection location of the movable mass; and
a conduction elastic member physically coupled to the enclosure and to the movable mass, the conduction elastic member electrically coupled to the conduction loop.

9. The actuator of claim 8, wherein the first and second movement elastic members comprise at least one of a flexure spring, a leaf spring, or a coil spring.

10. The actuator of claim 8, wherein a reaction force of the movement elastic member is between 100 and 1000 times greater than a spring force of the conduction elastic member.

11. The actuator of claim 8, wherein a density of the movable mass is greater than 15 grams per cubic centimeter.

12. The actuator of claim 8, wherein:
the conduction elastic member is a first conduction elastic member; and
the actuator further comprises:
a second conduction elastic member coupled to the enclosure and the movable mass; wherein
the second conduction elastic member is electrically coupled to the conduction loop.

13. The actuator of claim 12, wherein:
the enclosure has a longitudinal axis;
the first connection location is offset from the longitudinal axis in a first direction; and
the second connection location is offset from the longitudinal axis in a second direction, the second direction different from the first direction.

14. The actuator of claim 13, wherein:
the first conduction elastic member is connected to a third connection location of the movable mass, the third connection location offset from the longitudinal axis in a third direction, the third direction different from the first direction; and
the second conduction elastic member is connected to a fourth connection location of the movable mass, the fourth connection location offset from the longitudinal axis in a fourth direction, the fourth direction different from the second direction.

15. The actuator of claim 8, wherein the conduction elastic member is one of a flexure spring, a leaf spring, or a coil spring.

16. A method for operating an actuator to provide haptic output to an electronic device, the method comprising:
transmitting a drive signal to a conduction loop of the actuator, thereby causing the conduction loop and a movable body within the actuator to oscillate;
receiving, at a controller, feedback data indicating a position of the movable body within an enclosure of the actuator;
generating, by the controller and based on the feedback data, a signal for providing a haptic output via the actuator;
transmitting the signal to the conduction loop;
receiving second feedback data indicating a second position of the movable body; and
verifying, with the second feedback data, that the haptic output matches a desired haptic output.

17. The method of claim 16, wherein verifying that the haptic output matches the desired haptic output using the second feedback data comprises comparing at least one of a determined position, a determined velocity, or a determined acceleration with one or more expected values.

18. The method of claim 16, wherein the drive signal generates, by the conduction loop, a magnetic field that interacts with one or more additional magnetic fields, thereby causing the movable body within the actuator to oscillate.

19. The method of claim 16, wherein the second position of the movable body indicates unwanted motion of the movable body.

20. The method of claim 19, further comprising:
generating a corrective signal to mitigate the unwanted motion of the movable body; and
transmitting the signal to the conduction loop.

* * * * *